United States Patent
Santos et al.

(10) Patent No.: US 9,698,654 B2
(45) Date of Patent: Jul. 4, 2017

(54) SOFT SHUTDOWN FOR ISOLATED DRIVERS

(71) Applicant: Silicon Laboratories Inc., Austin, TX (US)

(72) Inventors: Paulo Santos, Santa Clara, CA (US); Tufan Karalar, Mountain View, CA (US); Michael J. Mills, Austin, TX (US); Ross Sabolcik, Austin, TX (US); Rudye McGlothlin, Austin, TX (US); Michael L. Duffy, Austin, TX (US); András Vince Horvath, Budapest (HU)

(73) Assignee: Silicon Laboratories Inc., Austin, TX (US)

( * ) Notice: Subject to any disclaimer, the term of this patent is extended or adjusted under 35 U.S.C. 154(b) by 894 days.

(21) Appl. No.: 14/036,176

(22) Filed: Sep. 25, 2013

(65) Prior Publication Data

US 2015/0085403 A1   Mar. 26, 2015

(51) Int. Cl.
| | |
|---|---|
| H02H 9/00 | (2006.01) |
| H02K 11/00 | (2016.01) |
| H02P 27/06 | (2006.01) |
| H02H 7/08 | (2006.01) |
| H02K 11/20 | (2016.01) |
| H02P 29/024 | (2016.01) |

(52) U.S. Cl.
CPC ......... *H02K 11/001* (2013.01); *H02H 7/0822* (2013.01); *H02H 9/001* (2013.01); *H02K 11/20* (2016.01); *H02P 27/06* (2013.01); *H02P 29/0241* (2016.02)

(58) Field of Classification Search
USPC .......................................... 361/18
See application file for complete search history.

(56) References Cited

U.S. PATENT DOCUMENTS

| | | | | |
|---|---|---|---|---|
| 6,097,582 | A * | 8/2000 | John ................. | H03K 17/0828 361/79 |
| 8,213,192 | B2 | 7/2012 | Konecny et al. | |
| 9,166,499 | B2 * | 10/2015 | Suzuki ................... | H02M 1/08 |

(Continued)

OTHER PUBLICATIONS

Analog Devices, Inc., "Isolated Half-Bridge Gate Driver with Integrated Isolated High-Side Supply," ADuM6132, 2008-2012, 16 pages.

(Continued)

*Primary Examiner* — Ronald W Leja
(74) *Attorney, Agent, or Firm* — Zagorin Cave LLP

(57) ABSTRACT

An apparatus for controlling a high-power drive device external to a package of a motor drive circuit includes a motor drive circuit. The motor drive circuit includes a driver to control the high-power drive device based on a first reference voltage, a second reference voltage, and a control signal based on a received control signal. A fault circuit generates a failure indicator based on a voltage across terminals of the high-power drive device. A fault condition is based on the failure indicator. A first terminal coupled to the driver charges a node of the high-power drive device over a first length of time in response to an absence of the fault condition and a first level of the control signal. A second terminal coupled to the driver discharges the node over a second length of time different from the first length of time.

24 Claims, 9 Drawing Sheets

(56) References Cited

U.S. PATENT DOCUMENTS

| | | | |
|---|---|---|---|
| 2004/0136135 A1* | 7/2004 | Takahashi | H03K 17/0828 361/100 |
| 2004/0251951 A1* | 12/2004 | Beck | H03K 17/691 327/427 |
| 2008/0106319 A1* | 5/2008 | Bayerer | H03K 17/0406 327/432 |
| 2008/0315925 A1 | 12/2008 | Alfano | |
| 2009/0021294 A1* | 1/2009 | Morishita | H02M 1/08 327/434 |
| 2011/0050198 A1 | 3/2011 | Dong et al. | |
| 2011/0157919 A1 | 6/2011 | Yedevelly et al. | |
| 2011/0157941 A1 | 6/2011 | Yedevelly et al. | |
| 2012/0161841 A1 | 6/2012 | Dong et al. | |
| 2013/0242438 A1* | 9/2013 | Fukuta | H02H 1/0007 361/18 |
| 2015/0015309 A1* | 1/2015 | Werber | H01L 29/7397 327/109 |
| 2015/0070078 A1* | 3/2015 | Jeong | H01L 29/7393 327/478 |
| 2015/0085403 A1* | 3/2015 | Santos | H02P 27/06 361/33 |

OTHER PUBLICATIONS

Analog Devices, Inc., "Isolated Half-Bridge Driver with Integrated High-Side Supply," ADuM5230, 2008-2013, 16 pages.

Agilent Technologies, "2.0 Amp Gate Drive Optocoupler with Integrated (VCE) Desaturation Detection and Fault Status Feedback," HCPL-316J, Mar. 1, 2005, 33 pages.

Avago Technogies, "Active Miller Clamp Products with Feature: ACPL-331J, ACPL-332J," Application Note 5314, Jul. 21, 2010, 6 pages.

Avago Technologies, "Dual-Output Gate Drive Optocoupler Interface with Integrated (VCE) DESAT Detection, FAULT and UVLO Status Feedback," ACPL-339J , Jan. 31, 2013, 23 pages.

Avago Technologies, "Desaturation Fault Detection Optocoupler Gate Drive Products with Feature: ACPL-333J, ACPL-330J, ACPL-332J, ACPL-331J, and HCPL-316J," Application Note 5324, Jan. 9, 2012, 7 pages.

Texas Instruments, "Precision Lowest-Cost Isolation Amplifier," ISO124, Sep. 1997—Revised Sep. 2005, 17 pages.

Texas Instruments, "Fully-Differential Isolation Amplifier," AMC1200 AMC1200B, Apr. 2011—Revised Aug. 2012, 24 pages.

* cited by examiner

US 9,698,654 B2

SOFT SHUTDOWN FOR ISOLATED DRIVERS

BACKGROUND

Field of the Invention

The present application is related to circuits and more particularly to control circuits for high-power applications.

Description of the Related Art

In a typical control application, a processor system provides one or more control signals for controlling a load system. During normal operation, a large DC or transient voltage difference may exist between the domain of the processor system and the domain of the load system, thus requiring an isolation barrier between the processor system and the load system. For example, one domain may be "grounded" at a voltage which is switching with respect to earth ground by hundreds or thousands of volts. Accordingly, an intermediate system includes isolation that prevents damaging currents from flowing between the processor system and the load system. Although the isolation prevents the processor system from being coupled to the load by a direct conduction path, an isolation channel allows communication between the two systems using optical (opto-isolators), capacitive, inductive (transformers), or electromagnetic techniques. However, the intermediate system typically uses a voltage converter and output driver to provide the control signal at voltage levels suitable for the load system.

Referring to FIG. 1, in an exemplary motor control application, processor 100, which may be a microprocessor, microcontroller, or other suitable processing device, operates in a first domain (i.e., VDD1, e.g., 5 Volts (V)) and provides one or more signals for a high power load system operating in a second domain (i.e., VDD2, e.g., 600V). Systems 102 each include an isolation barrier 130 and a communication channel for safely communicating control signals from processor 100 to drivers 106, which drive high-power drive devices 108 of a three-phase inverter used to deliver three-phase power to motor 120. Exemplary high-power drive devices include power metal-oxide-semiconductor field-effect transistors (MOSFETs), insulated-gate bipolar transistors (IGBTs), Gallium-Nitride (GaN) MOSFETs, Silicon-Carbide power MOSFETs, and other suitable devices able to deliver high currents over short periods of time.

Voltage converters 104 convert an available power supply voltage from VDD2 to a voltage level (i.e., VDD3, e.g., 24V) usable by a high side of systems 102 and drivers 106. Note that in other embodiments, a single voltage converter 104 converts one power supply voltage from a first voltage level (e.g., VDD2) to multiple other voltage levels (e.g., VDD1 and VDD3) and/or provides multiple outputs of a particular voltage (e.g., multiple VDD3 outputs corresponding to multiple systems 102). Drivers 106 provide switch control signals at levels required by corresponding high-power drive devices 108 of the three-phase inverter. The load motor requires three-phase power at high power levels. Systems 102 that correspond to high-power devices coupled to VDD2 (high-side inverter devices), are "grounded" at a voltage that is switching with respect to earth ground by the high voltage levels of VDD2.

Typical high power devices 108 of the three-phase inverter that are used to drive motor 120 require substantial turn-on voltages (e.g., voltages in the range of tens of Volts) and are susceptible to fault conditions that may damage those devices. For example, when a short circuit current condition exists, that is, both devices of an individual inverter are on, high current flows through those devices, which may destroy them. Accordingly, fault detection techniques detect this desaturation condition. System 102 may send an indicator thereof to processor 100, and system 102 or processor 100 may trigger a shut-down of a corresponding device. However, if a high-power drive device 108 is shut-off suddenly, large di/dt induced voltage spikes may occur in the motor control signal. Such voltage spikes could be damaging to the drive circuit and/or load. Accordingly, flexible techniques for handling faults without damaging high-power drive devices or the load which those devices control are desirable.

SUMMARY OF EMBODIMENTS OF THE INVENTION

In at least one embodiment of the invention, an apparatus for controlling a high-power drive device external to a package of a motor drive circuit includes a motor drive circuit. The motor drive circuit includes a driver configured to control the high-power drive device at least partially based on a first reference voltage, a second reference voltage, and a control signal based on a received control signal received by the motor drive circuit. The motor drive circuit includes a fault circuit configured to generate a failure indicator based on a voltage across terminals of the high-power drive device. A fault condition is at least partially based on the failure indicator. The motor drive circuit includes a first terminal coupled to the driver. The first terminal is configured to charge a node of the high-power drive device over a first length of time in response to an absence of the fault condition and a first level of the control signal. The motor drive circuit includes a second terminal coupled to the driver. The second terminal is configured to discharge the node of the high-power drive device over a second length of time, the second length of time being different from the first length of time. The second terminal may discharge the node of the high-power drive device over the second length of time in response to an absence of a fault condition and a second level of the control signal. At least one of the first terminal, the second terminal, and a third terminal are configured to discharge the node of the high-power drive device over a third length of time in response to a presence of the fault condition. The third length of time is independent of the second length of time. The first terminal may be configured to discharge the node of the high-power drive device over a third length of time in response to the presence of the fault condition. The motor drive circuit may include a third terminal coupled to the driver. The third terminal may be configured to discharge the node of the high-power drive device over a third length of time in response to a presence of the fault condition. The third length of time may be independent of the first and second lengths of time.

In at least one embodiment of the invention, a method for controlling a high-power drive device external to a package of a motor drive circuit includes sensing a voltage across terminals of the high-power drive device. The method includes determining a fault condition at least partially based on the sensed voltage. The method includes charging a node of the high-power drive device over a first length of time, using a first terminal, in response to an absence of the fault condition and a first level of a control signal based on a received control signal received by the motor drive circuit. The method includes discharging the node of the high-power drive device over a second length of time, using a second terminal, the second length of time being different from the first length of time. The node of the high-power drive device may be discharged over the second length of time in response to an absence of the fault condition and a second level of the control signal. The method may include discharging the node of the high-power drive device over a third length of time using at least one of the first terminal, the second terminal, and a third terminal, the discharging being in response to detection of the fault condition. The third length of time is independent of the second length of time. The node of the high-power drive device may be discharged over the second length of time in response to an absence of the fault condition and a second level of the control signal, and the method further includes selecting the first length of time using a first passive element coupled to the first terminal of the motor drive circuit. The method may include selecting the second length of time using a second passive element coupled to the second terminal of the motor drive circuit. The method may include discharging the node of the high-power drive device over a third length of time in response to detection of the fault condition. The method may include selecting the third length of time using a third passive element coupled to at least one of the first terminal, the second terminal, or a third terminal of the motor drive circuit.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
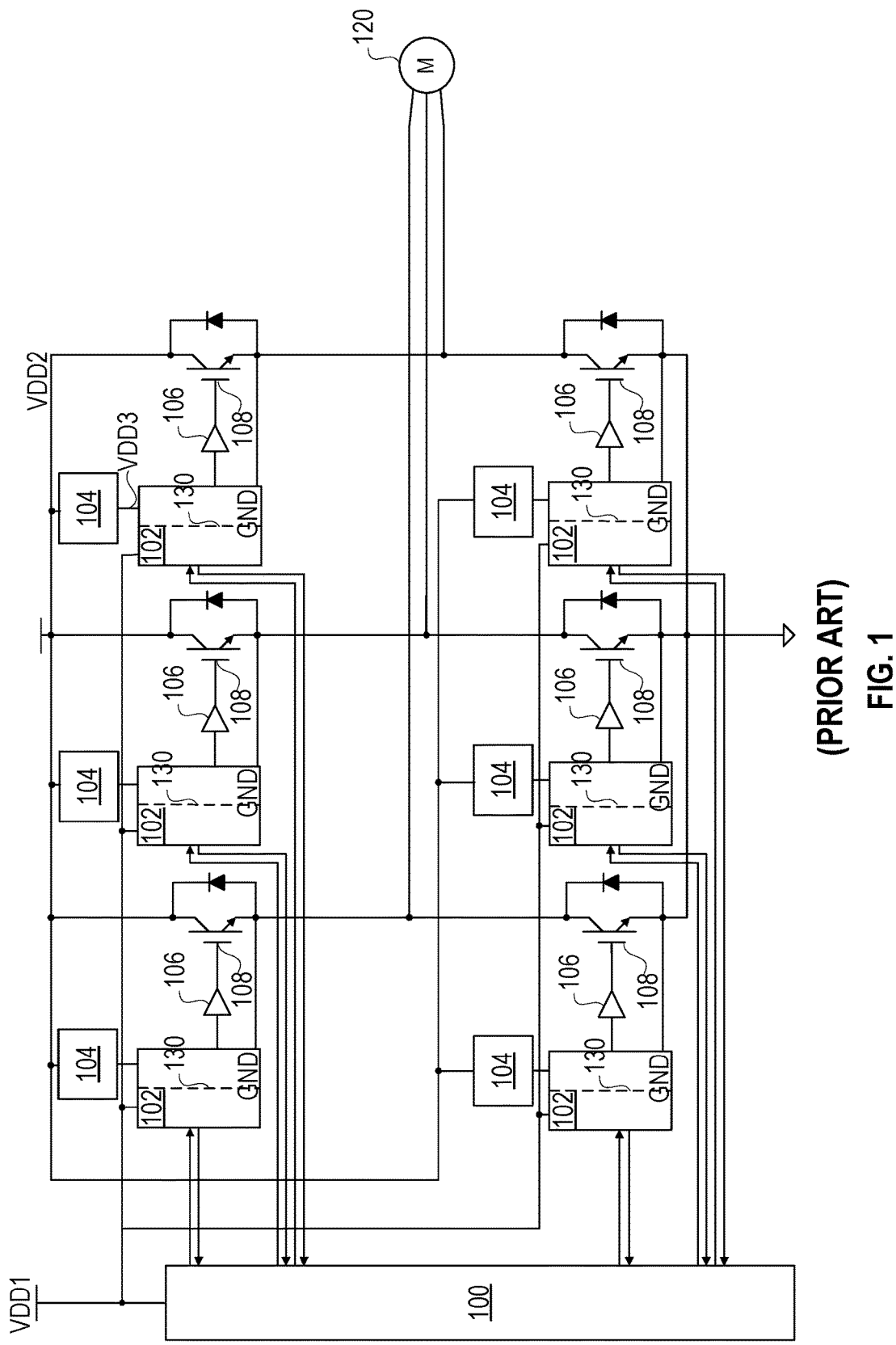
FIG. 1 illustrates a functional block diagram of a typical motor control system.
Figure 2:
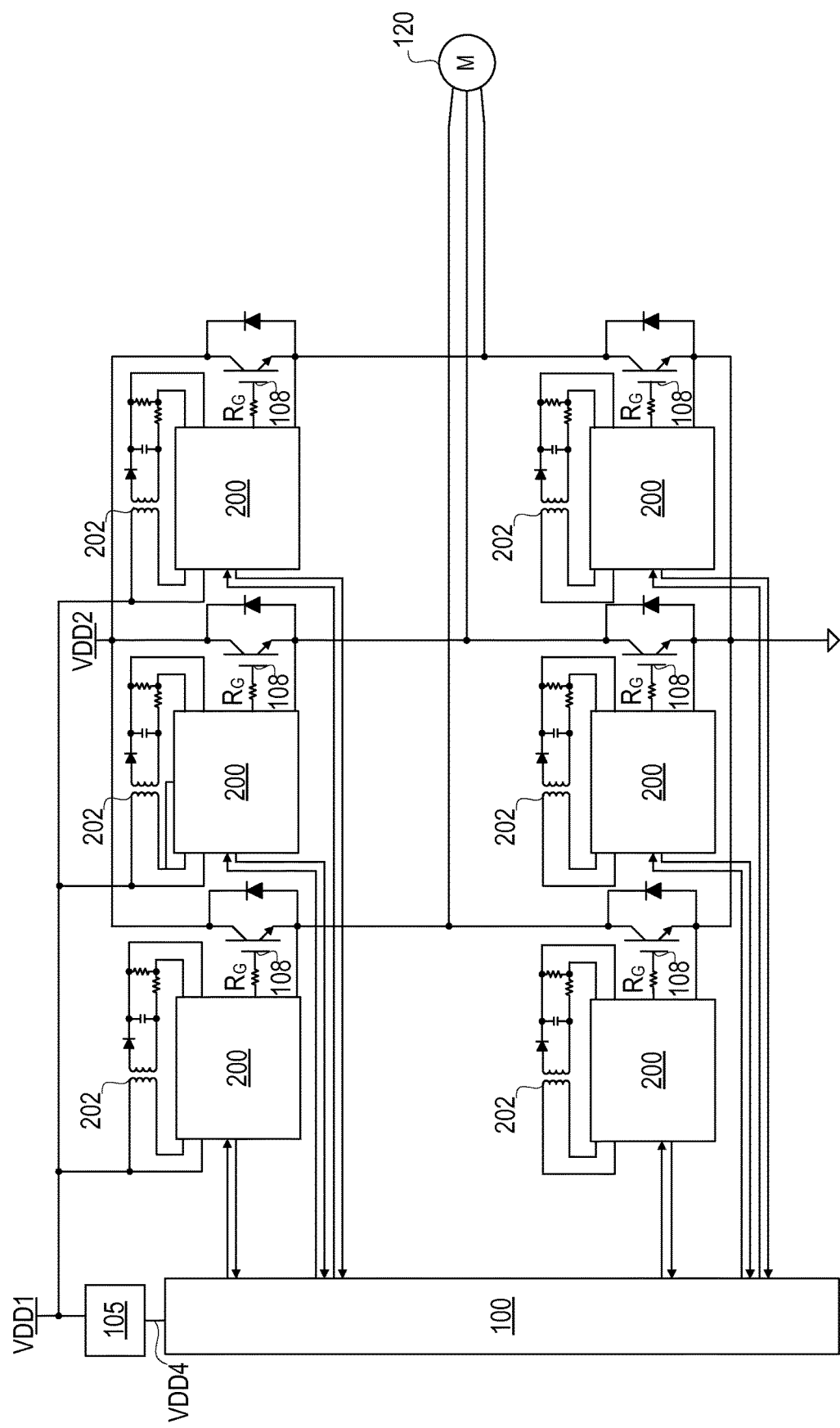
FIG. 2 illustrates a functional block diagram of a motor control system including motor drive circuits including integrated voltage conversion and driver circuits consistent with at least one embodiment of the invention.

Referring to FIG. 2, in an exemplary motor control application, processor 100 receives a voltage (e.g., VDD4, e.g., 3V) from voltage converter 105 based on a first domain (i.e., VDD1, e.g., 5V) and provides one or more signals for a high power load system operating in a second domain (i.e., VDD2, e.g., hundreds of volts). Note that other embodiments of processor 100 operate in the first domain. Motor drive circuits 200 each include an isolation barrier and a communication channel for safely communicating control signals from processor 100 across the isolation barrier to drive high-power drive devices 108 of a three-phase inverter used to deliver three-phase power to motor 120. In at least some embodiments, motor drive circuits 200 include integrated voltage regulation and control for an external transformer 202 of a voltage converter. By integrating the voltage regulation and DC-to-DC controller 205 functions into motor drive circuit 200, which interacts with an external transformer 202, a high-Q inductor may be used in the voltage conversion, yet fewer other additional elements are required external to the motor control system. Typical motor control system use unregulated voltage converters and/or rely on a transformer turns ratio alone to achieve the target voltage level. The system of FIG. 2 includes a transformer having many taps, allowing improved voltage regulation as compared to other motor control systems. By integrating voltage regulation into motor drive circuits 200, less printed circuit board routing is used by the system of FIG. 2. Accordingly, the system of FIG. 2 can achieve improved performance with reduced printed circuit board routing and system cost as compared to a system using an integrated circuit or chip-scale transformer and/or other voltage conversion techniques.

Figure 3:
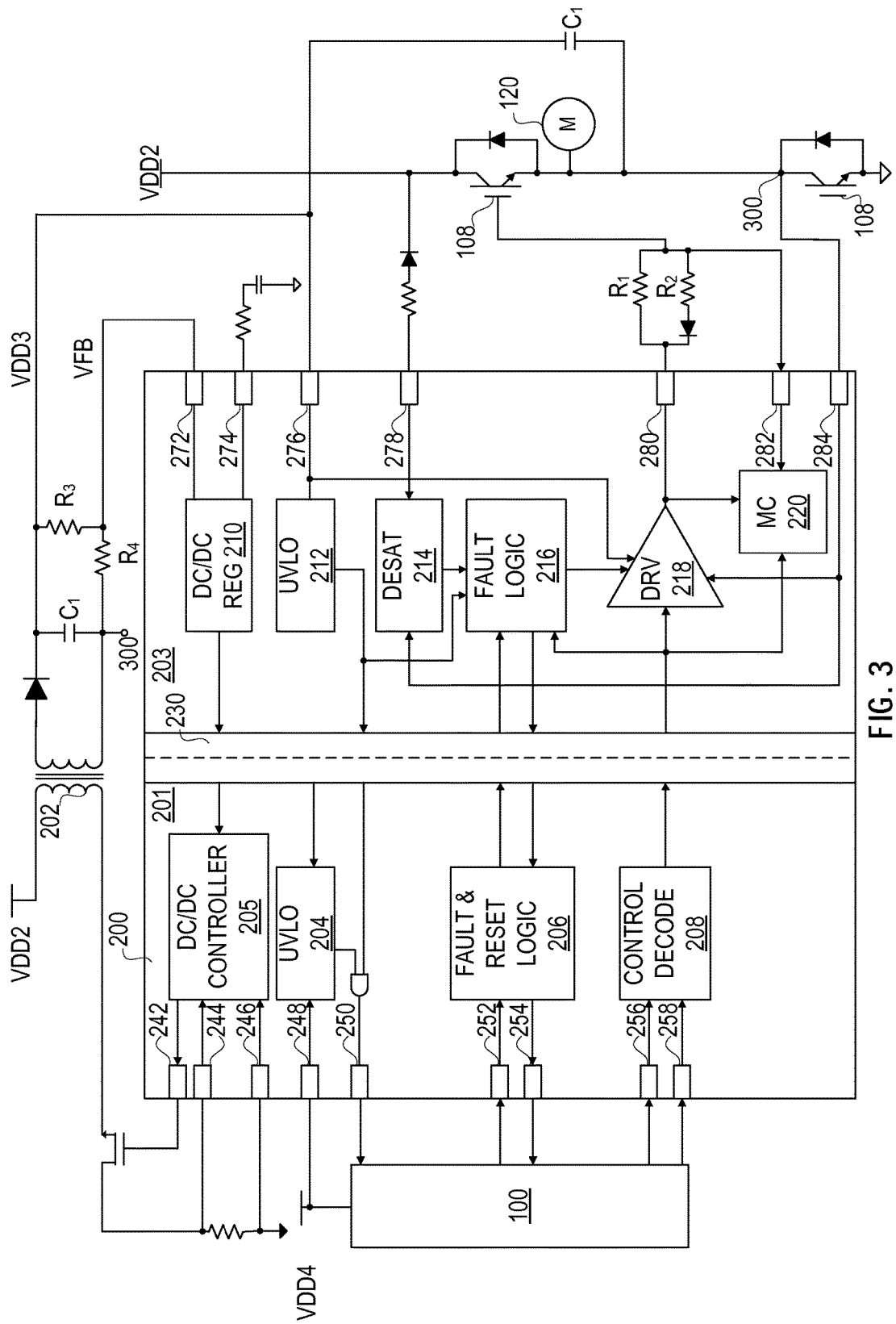
FIG. 3 illustrates a functional block diagram of a motor drive circuit including integrated voltage conversion and driver circuits consistent with at least one embodiment of the invention.

Referring to FIG. 3, exemplary motor drive circuit 200 includes isolation channel 230, which may isolate the domains on a first side, e.g., primary side 201, of motor drive circuit 200, which operates using VDD1 (e.g., less than ten volts), and a second side, e.g., secondary side 203, of motor drive circuit 200, which operates using VDD3 (e.g., tens of volts). Isolation channel 230 facilitates communication between primary side 201 and secondary side 203. Any suitable communication technique that does not use a conductive path between the two sides may be used, e.g., optical, capacitive, inductive, or electromagnetic techniques. An exemplary isolation channel is described in U.S. Provisional Application No. 61/872,537, entitled "Transport of an Analog Signal Across an Isolation Barrier," filed on Aug. 30, 2013, naming Jeffrey L. Sonntag, Douglas R. Frey, and Michael J. Mills as inventors, which application is hereby incorporated by reference. Isolation channel 230 facilitates communication of a control signal received by primary side 201 from processor 100 and to secondary side 203. Secondary side 203 includes driver 218, which generates an output control signal based on the received control signal received from the primary side 201 and provides it to terminal 280. In an exemplary embodiment, motor drive circuit 200 includes multiple integrated circuits configured as a multi-chip module in a single package. For example, motor drive circuit 200 includes a first integrated circuit to implement primary side 201 and a second integrated circuit to implement secondary side 203. In such embodiments, terminals 242, 244, 246, . . . , 284 are pins of a package of the multi-chip module coupled to external elements, e.g., a transformer, discrete resistors and capacitors, and a package of processor 100.

DC-to-DC controller 205 and DC-to-DC regulator 210 of motor drive circuit 200 and external transformer 202 form a flyback converter, which is a buck-boost converter. DC-to-DC regulator 210 senses the feedback voltage (e.g., approximately 1.25V) provided by the secondary side of the transformer on terminal 272 and compares the sensed feedback voltage to a voltage reference. The comparison is compensated based on a voltage on terminal 274 and fed back to DC-to-DC controller 205. DC-to-DC controller 205 provides switch control signals (e.g., on terminal 244) to adjust a pulse-width modulated signal that drives the primary side of external transformer 202 to achieve a target voltage on the secondary side of external transformer 202 based on the feedback from DC-to-DC regulator 210 and voltage sensed on terminals 244 and 246. The voltage converter converts VDD2 to VDD3 so that motor drive circuit 200 can generate one or more control signals, i.e., a control signal (e.g., a control signal having voltage levels in the tens of volts) sufficient to drive a high-power drive device 108 without damaging motor drive circuit 200. In other embodiments of motor drive circuit 200, other power converter architectures and other reference voltage levels may be used (e.g., a voltage converter that converts VDD1 to VDD3). As referred to herein, a control signal is sufficient to control a high-power drive device if the control signal can enable (i.e., turn on) the high-powered drive device without being coupled to any additional active devices or devices that are coupled to a voltage reference node for the purpose of amplifying or otherwise increasing a voltage level of the control signal.

Figure 4A:
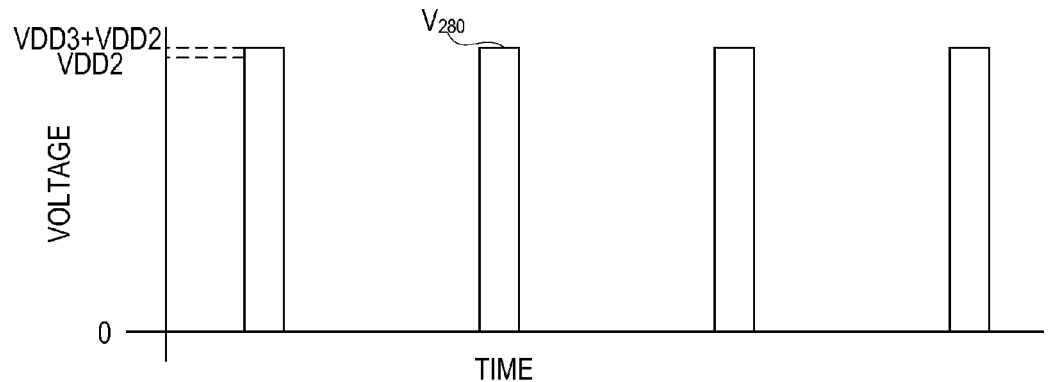
FIG. 4A illustrates a voltage waveform of a switching node of the motor control system of FIG. 2.
Figure 4B:
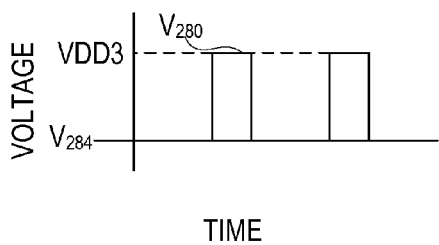
FIG. 4B illustrates a voltage waveform of an output signal of the motor drive circuit of FIGS. 2 and 3.

Exemplary waveforms of the voltages associated with high-power drive device 108 for a three-phase power application are illustrated in FIGS. 4A and 4B. FIG. 4A illustrates the switching voltage on terminal 280 when motor drive circuit 200 drives the high-side switch of an inverter and terminal 284 is coupled to node 300, i.e., motor drive circuit 200 is "grounded" at a voltage that is switching with respect to earth ground by VDD2 (e.g., hundreds or thousands of volts). FIG. 4B illustrates the voltage on terminal 280, as generated by motor drive circuit 200 when driving the corresponding low-side switch of the inverter and terminal 284 is coupled to earth ground.

Referring back to FIG. 3, the pull-up strength and the pull-down strength of the output control signal provided to high-power drive device 108 can be independently adjusted from the RDS(ON) of the integrated pull-up output device coupled to terminal 280 using one or more passive elements. For example, resistor $R_1$ adjusts the pull-up strength by $1/R_1$. Use of a diode coupled between $R_2$ and terminal 280 provides the ability to adjust the pull-down strength of the signal provided to the gate of high-power drive device 108 to have a strength different from the pull-up strength of the signal provided to the gate of high-power drive device 108. Resistor $R_2$ and the diode adjust the pull-down strength of the signal provided to the gate of high-power drive device 108 by $$\frac{1}{(R_1 \| R_2)}.$$

Figure 5:
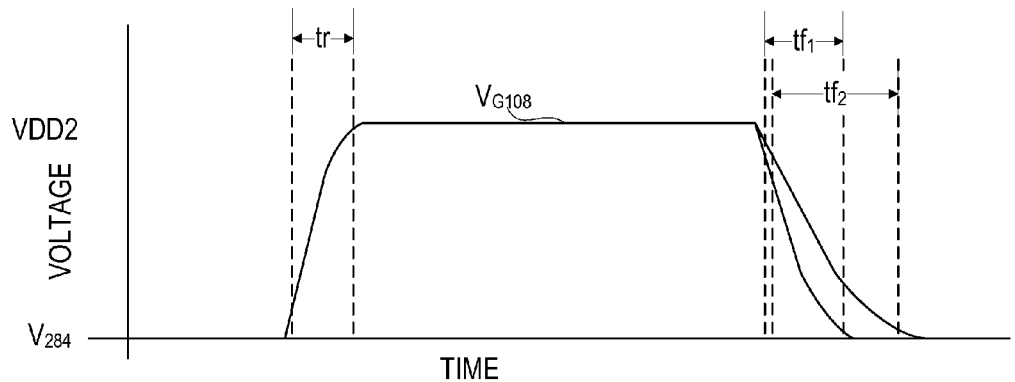
FIG. 5 illustrates details of the exemplary output control signal of the motor drive circuit of FIG. 3 consistent with at least one embodiment of the invention.

Typically, the pull-up time is selected to be slower than the pull-down time and the values of $R_1$ and $R_2$ will vary with specifications of different implementations of high-power drive device 108 (e.g., power MOSFET, IGBT, GaN MOSFET, Si-Carbide power MOSFET, etc.). An exemplary waveform of the voltage provided to the control terminal of high-power drive device 108 is illustrated in FIG. 5. In the absence of a fault condition, the voltage on the gate of high-power drive device 108 has a rise time of tr and a fall time of $tf_1$.

Figure 6:
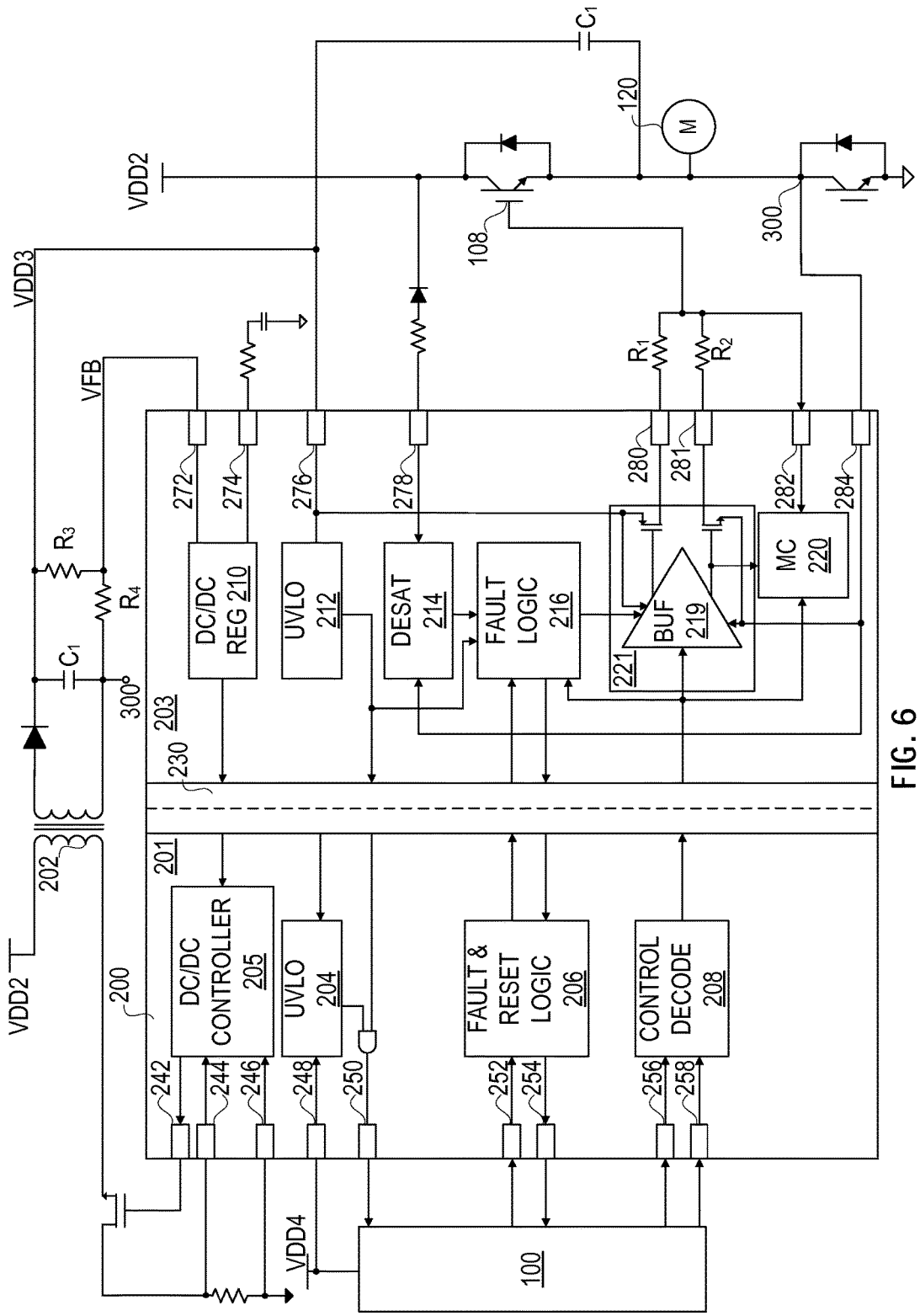
FIG. 6 illustrates a functional block diagram of a motor drive circuit using a split-pin output drive technique consistent with at least one embodiment of the invention.

Referring to FIG. 6, in at least one embodiment of motor drive circuit 200, the package of motor drive circuit 200 is not pin-limited and an additional terminal is included to drive the control terminal of high-power drive device 108. The additional terminal may be used to adjust the pull-down strength using an external resistor and the diode of FIG. 5 is not needed. Referring back to FIG. 6, driver 221 includes a pull-up device coupled to terminal 280 and driver 221 includes a pull-down device coupled to terminal 281. In addition, driver 221 may include buffer 219 that amplifies a control signal received from primary side 201 that is used to control the pull-up and pull-down devices. Buffer 219 may generate one control signal or two separate control signals for the pull-up device and the pull-down device based on the control signal received across the isolation channel from control decoder 208 of primary side 201, which receives the control signal on differential terminals 256 and 258 from processor 100. The pull-up strength is adjusted by $1/R_1$ and is independent of the pull-down strength, which is adjusted by $1/R_2$. Although the control signal is illustrated as a differential signal received on differential terminal 256 and 258, note that in other embodiments, the control signal may be a single-ended signal. In general, signals illustrated herein as single-ended signals may be implemented as differential signals in other embodiments and signals illustrated herein as differential signals may be implemented as single-ended signals in other embodiments.

Referring back to FIG. 3, isolation channel 230 facilitates feedback of voltage information and fault information from secondary side 203 to primary side 201. The voltage information is used by DC-to-DC controller 205 to control the primary side of external transformer 202 to adjust the output voltage, VDD2, of the secondary side of external transformer 202. The secondary side of external transformer 202 is used to generate reference voltages for circuits of secondary side 203. Secondary side 203 includes integrated fault detection modules that generate one or more fault indicators that may be provided to fault and reset logic 206, which communicates fault handling signals between processor 100 and isolation channel 230 using terminals 252 and 254, and/or automatically handles faults by controlling output driver 218 accordingly. Fault detection logic 216 receives fault information from one or more integrated fault detection modules to prevent damage to the high-power drive devices. For example, secondary side 203 includes modules that detect fault conditions associated with high-power drive devices, e.g., undervoltage lockout detector 212 and desaturation detector 214, and may also detect user-initiated faults received from processor 100. Fault indicator(s) may be used by fault detection logic 216 and/or processor 100 to prevent damage to the high-power drive devices.

Miller clamp 220 reduces effects of parasitic turn-on of high-power drive device 108 due to charging of the Miller capacitor (e.g., the collector-gate parasitic capacitor of an IGBT device). That gate-collector coupling can result in parasitic turn on of device 108 in response to a high dV/dt transient (i.e., a gate voltage spike) created while high-power drive device 108 is turned off. The gate voltage spike is created when turning on another high-power drive device coupled to high-power drive device 108. For example, when turning on upper device 108 of an inverter of FIG. 2, a corresponding lower high-power drive device 108 coupled to upper high-power drive device 108 experiences a voltage change $dV_{CE}/dt$ causing current flow into a gate drive terminal coupled to the lower device. That current may be sensed by Miller clamp 220 using terminal 282, coupled to the gate of high-power drive device. That current creates a voltage drop across any gate resistor $R_G$ and increases the gate-emitter voltage of a corresponding lower high-power drive device 108. If the gate-emitter voltage exceeds the device threshold voltage, lower high-power drive device 108 will turn on. A similar parasitic turn-on event occurs when turning on lower high-power drive device 108 of FIG. 2 and a corresponding upper high-power drive device 108 is in an off state.

Figure 8:
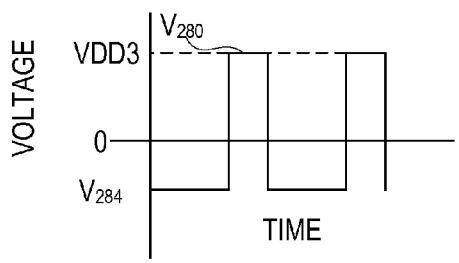
FIG. 8 illustrates a voltage waveform of an output signal of the motor drive circuit of FIG. 7.
Figure 7:
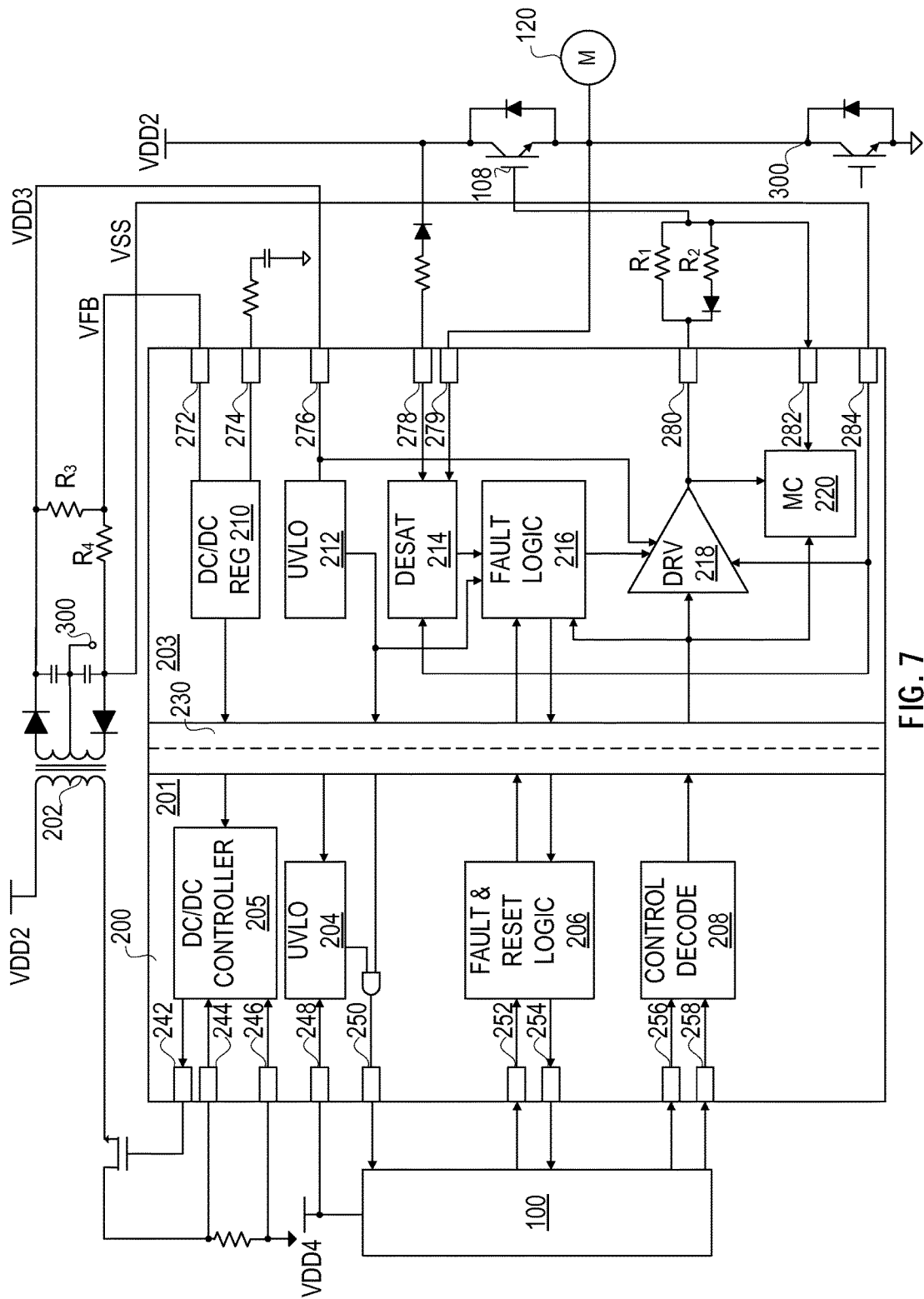
FIG. 7 illustrates a functional block diagram of a motor drive circuit using a negative gate drive technique consistent with at least one embodiment of the invention.
Figure 9:
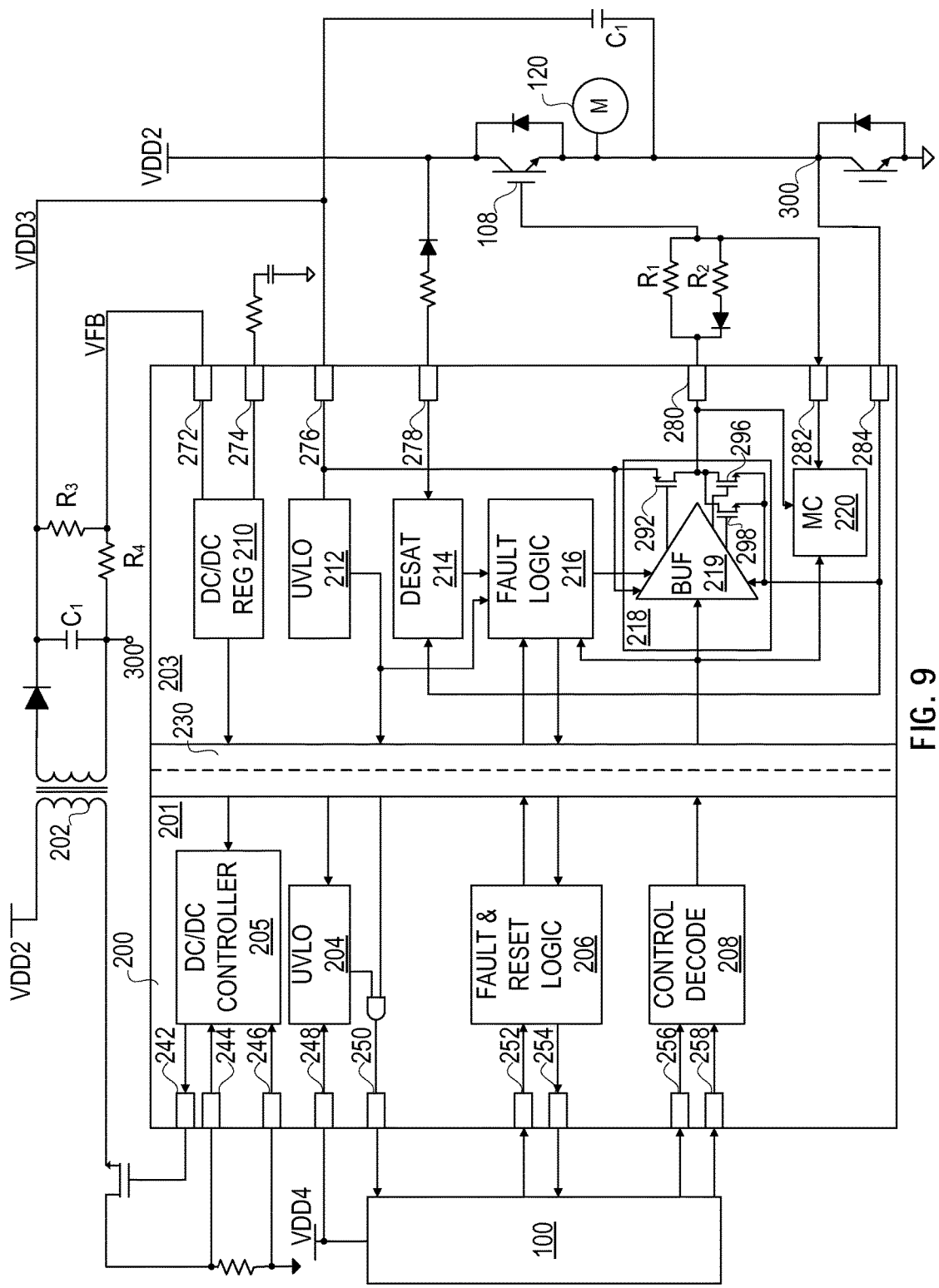
FIG. 9 illustrates a functional block diagram of a motor drive circuit implementing a soft shutdown technique using one pin.

In other embodiments of motor drive circuit 200, Miller clamp 220 is not needed. For example, a sufficient gate capacitor coupled between the gate and emitter of each high-power drive device 108 will shunt any Miller current and raise the level of the transient that may parasitically turn on the device. However, such solution requires a higher gate charge to reach the threshold voltage of high-power drive device 108, increases the driver power, and increases switching losses of high-power drive device 108. In other embodiments of motor drive circuit 200, three voltage rails include a negative supply voltage to increase the threshold voltage of high-power drive device 108. For example, referring to FIG. 7, a tap of transformer 202 is coupled to the emitter of device 108 (e.g., node 300) and the three voltage references include VDD3 (e.g., 24V above $V_{300}$), $V_{300}$ (e.g., a reference voltage level between VDD3 and VSS), and VSS (e.g., a voltage below $V_{300}$). Note that when a high-power drive device 108 is configured as the low-side switch of a corresponding inverter, rather than being coupled to node 300, the tap of transformer 202 is coupled to ground and the three voltage references include VDD3 (a positive voltage, e.g., 24V), $V_{300}$ (0V), and VSS (a negative supply voltage). Terminal 284 is coupled to another tap of the transformer and configured to provide a negative supply voltage to motor drive circuit 200. A corresponding output signal on terminal 280 is illustrated in FIG. 9. Referring back to FIG. 7, the negative supply voltage increases the transient voltage level needed to cause a parasitic turn on of high-power drive device 108. FIG. 8 illustrates a waveform for the voltage on terminal 280 corresponding to the embodiment of motor drive circuit 200 of FIG. 7.

Referring back to FIG. 3, motor drive circuit 200 includes desaturation fault protection for power semiconductor switches, which protects against short-circuit current events that may destroy high-power drive device 108. This fault may result from an insufficient gate drive signal caused by inverter gate driver misbehavior, drive supply voltage issues, a short circuit in a power stage, or other excessive current or power dissipation of the high-power drive devices. Drastically increased power dissipation can quickly overheat the high-power drive devices and destroy them. Desaturation fault protection reduces or turns-off overcurrents during the fault condition. In a typical application, terminal 278 is coupled to an external resistor and diode, which are coupled to a collector terminal of high-power drive device 108 (e.g., the collector of an IGBT or source of a MOSFET). Desaturation detection circuit 214 senses when $V_{CESAT}$ of high-power drive device 108 exceeds a predetermined threshold voltage (e.g., 7V). Note that the predetermined threshold voltage of desaturation detection circuit 214 may be externally adjusted based on the forward voltage of one or more diodes coupled to the desaturation resistor coupled to terminal 278 and/or based on the resistance of that desaturation resistor. In addition, a delay time may be introduced by coupling a capacitor between terminal 278 and an external power supply node.

In general, undervoltage lockout prevents application of insufficient voltage to the control terminal of high-power drive device 108 by forcing the output on terminal 280 to be low during power-up of motor drive circuit 200. Undervoltage lockout detector 212 detects when the power supply voltage (e.g., senses VDD3 using terminal 276) exceeds a first predetermined undervoltage lockout threshold voltage and generates an indication thereof, which may be used to disable the lockout condition. Undervoltage lockout detector 212 also detects when the power supply voltage falls below a second predetermined undervoltage lockout threshold, which may be different from the first undervoltage lockout threshold voltage to provide noise margin for the undervoltage lockout voltage detection. Similarly, undervoltage lockout detector 204 detects when VDD1 exceeds one or more predetermined voltages using terminal 248. The indicators generated by undervoltage lockout detector 204 and undervoltage lockout detector 212, the latter of which is received across the isolation channel 230, may be provided to processor 100 using terminal 250.

Upon detection of a fault condition by modules on secondary side 203, fault logic 216 may automatically initiate shutdown of high-power drive device 108 and report the fault condition to processor 100. Alternatively, fault logic 216 may only report the fault condition to primary side 201 and high-power drive device 108 may continue operation. Then, primary side 201 may report the fault condition to processor 100. Since a system may include multiple high-power drive devices (e.g., six high-power drive devices 108 in the exemplary motor control application of FIG. 2), shutting down only one of these devices may harm the high-power drive devices and/or the load. Therefore, in response to detection of a fault, processor 100 may initiate a shutdown of high-power drive device 108 only after detecting a predetermined number of faults over a particular period of time or other condition is satisfied. In at least one embodiment, processor 100 initiates shutdown of high-power drive device 108 independent of any fault detection from motor drive circuit 200 (e.g., based on fault detection from another motor drive circuit 200 associated with another high-power drive device 108).

In response to a fault condition, processor 100 or fault logic 216 may initiate a shutdown of high-power drive device 108. However, an abrupt turn-off of high-power drive device 108 may result in large di/dt induced voltages. Instead, processor 200 initiates a "soft" shutdown of high-power drive device 108 that slowly discharges the control terminal of high-power drive device 108 at a rate having a fall time longer than the regular fall time of the output control signal. Referring to FIG. 9, in an embodiment of motor drive circuit 200, terminal 280 is coupled to pull-up device 292, pull-down device 296, and pull-down device 298 of high-power drive driver 218. Pull-down device 296 is a standard-sized device and pull-down device 298 is a smaller device that is used to change the pull-down strength of the signal coupled to terminal 280 by $$\frac{1}{(R_1 \| R_2) + R_{SW298}},$$

where $R_{SW298}$ is the impedance of pull-down device 298. Referring back to FIG. 5, as a result, the soft-shutdown fall time of terminal 280 is tf$_2$, e.g., where tf$_2$>tf$_1$, when pull-down device 298 is enabled. Such an implementation provides a user little flexibility for adjusting the soft-shutdown fall time and no flexibility to increase the strength of the soft shutdown.

Figure 10:
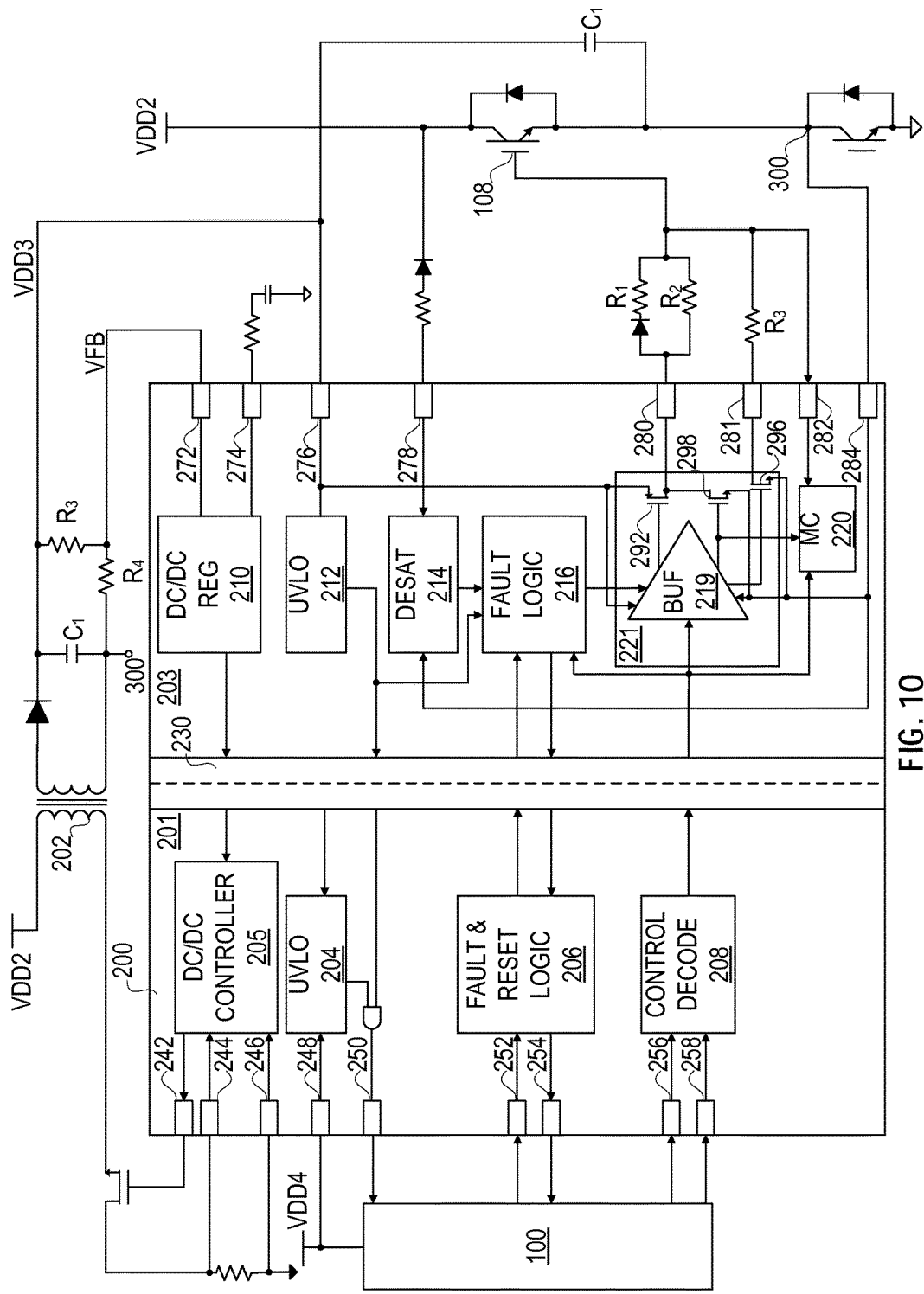
FIG. 10 illustrates a functional block diagram of a motor drive circuit implementing a soft shutdown technique using two pins consistent with at least one embodiment of the invention.

Referring to FIG. 10, in an embodiment of motor drive circuit 200 that includes a terminal coupled to an internal pull-up device and a pin coupled to the internal pull-down device, soft shut-down is implemented by coupling pull-down device 298, which is a smaller switch than pull-down device 296, to pull-up device 292. Accordingly, the signal provided to the high-power drive device has a pull-up strength that is based on $1/(R_1 \| R_2)$, a pull-down strength based on $1/R_3$, and a soft-shutdown pull-down strength based on $$\frac{1}{R_{TOT}} = \frac{1}{(R_2) + R_{SW298}}.$$

In general, the pull-up or pull-down speed is proportional to $$\frac{1}{R_{TOT}}.$$

In this embodiment of motor drive circuit 200, resistor $R_2$ may be excluded in applications where the strength of pull-down device 298 provides sufficiently low soft shut-down pull-down strength. In addition, the diode may be excluded. Although $R_2$ affects both the rise time and the soft-shutdown time of the control signal, the configuration of the three external resistors and the two terminals provides three degrees of freedom for programming the rise time, fall time, and soft-shutdown fall time of the control signal provided to the high-power drive device 108. Accordingly, the soft-shutdown fall time of the control signal can be adjusted independent of the regular fall time and independent of the rise time. In at least one embodiment, a diode is coupled between terminal 280 and external resistor $R_1$ and the diode in series with $R_2$ is excluded to increase the strength of the pull-up as compared to the soft-shutdown strength. Note that in other embodiments, terminals 280 and 281, pull-up device 292, pull-down devices 296 and 298, and passive elements between terminals 280 and 281 and high-power drive device 108 implement different configurations of rise-time, fall-time, and soft-shutdown fall time. For example, terminal 280, pull-up device 292, pull-down device 298, and passive elements coupled between terminal 280 and high-power drive device 108 may be configured to implement the rise time and fall time of the control signal in the absence of a fault condition and terminal 281, pull-down device 296, and passive elements coupled between terminal 281 and high-power drive device 108 may be configured to implement the soft-shutdown fall time. In such embodiments, the soft-shutdown fall time of the control signal can be adjusted independent of the regular fall time and to have a strength different from the strength of the rise time.

Figure 11:
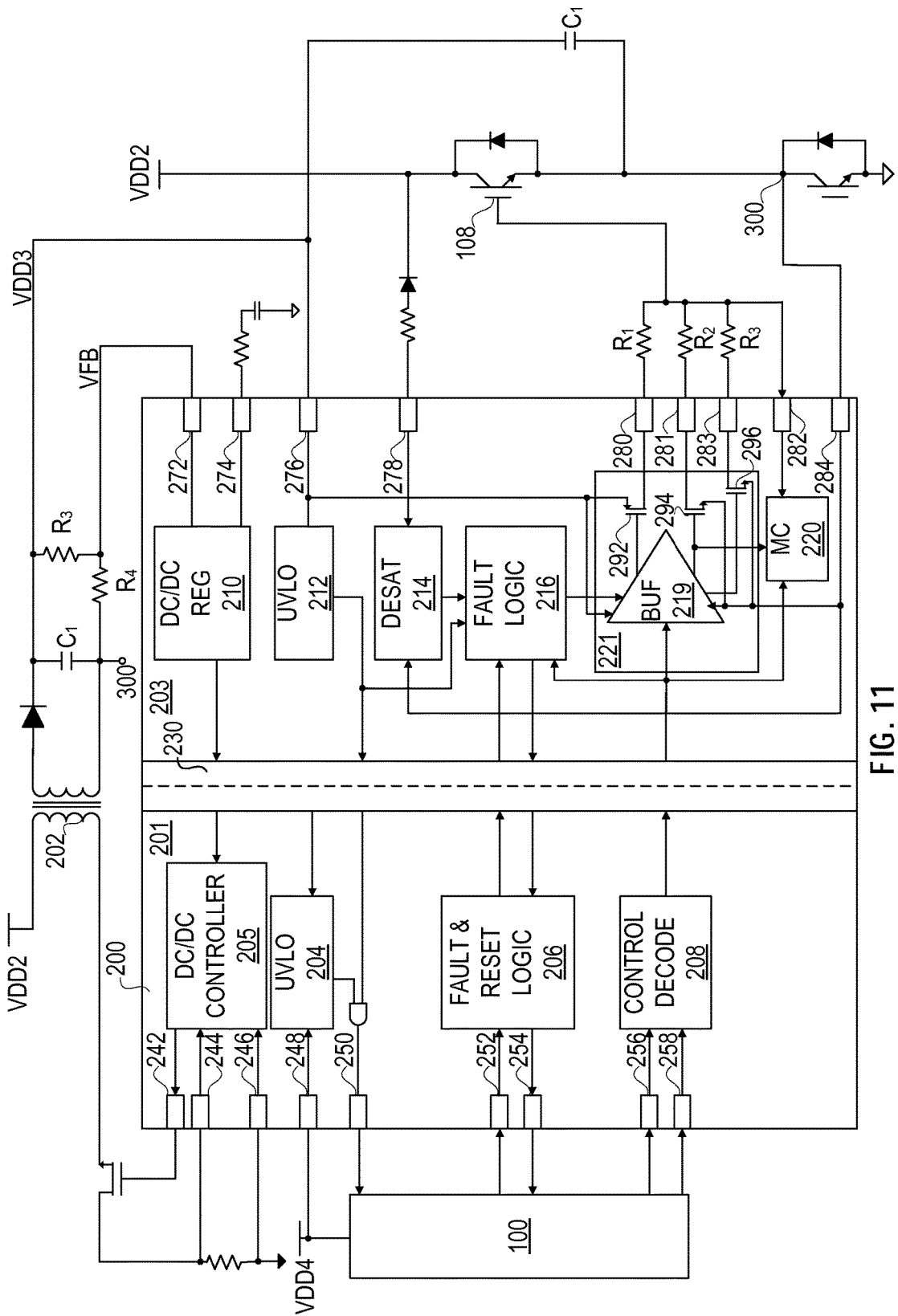
FIG. 11 illustrates a functional block diagram of a motor drive circuit implementing a soft shutdown technique using three pins consistent with at least one embodiment of the invention.

Referring to FIG. 11, in an embodiment of motor drive circuit 200, secondary side 203 includes three terminals that are coupled to driver 221 and are used to provide the output control signal to high-power drive device 108. For example, terminal 280 is coupled to internal pull-up device 292 and external resistor $R_1$, which affects the rise time of the control signal. Terminal 281 is coupled to internal pull-down device 294 and external resistor $R_2$, which affects the fall time of the control signal. Terminal 283 is coupled to pull-down device 296 and external resistor $R_3$, which affect the soft shutdown fall time of the control signal. Note that pull-down devices 294 and 296 may be the same strength and the user can select how much soft shutdown strength to implement in the system by using an appropriate external resistor $R_3$ or other suitable network (e.g., a network including resistor, capacitor, and/or buffer circuits). Accordingly, the rise-time, fall-time, and soft-shutdown time of the control signal provided to high-power drive device 108 are programmable externally and are entirely decoupled from each other. Note that in at least one embodiment, Miller clamp 220 is excluded from motor drive circuit 200.

After a soft shutdown, motor drive circuit 200 may reset the fault condition. For example, after a next rising edge of the control signal received from processor 100, motor drive circuit 200 may reset the fault condition and send the control signal to motor drive circuit 200 to turn on high-power drive device 108. Alternatively, motor drive circuit 200 may ignore rising edges of the control signal received from processor 100 until a reset signal is applied on terminal 252 of primary side 201. In another embodiment, motor drive circuit 200 ignores rising edges of the control signal received from processor 100 (e.g., on differential terminals 256 and 258) after soft-shutdown, for a finite, predetermined period of time after which motor drive circuit 200 resets the fault and turns on high-power drive device 108. In other embodiments of motor control circuit 200, other reset techniques may be used.

The description of the invention set forth herein is illustrative, and is not intended to limit the scope of the invention as set forth in the following claims. For example, while the invention has been described in an embodiment in which motor drive circuit 200 is coupled to an IGBT high-power drive device, one of skill in the art will appreciate that the teachings herein can be utilized with other device types. In addition, while the invention has been described in embodiments in which motor drive circuit 200 includes an isolation channel and voltage converter circuits, one of skill in the art will appreciate that the teachings herein can be utilized with other device motor drive circuits that fully integrate the transformer or that exclude DC-to-DC controller 205, DC-to-DC regulator 210, and/or isolation channel 230. Variations and modifications of the embodiments disclosed herein, may be made based on the description set forth herein, without departing from the scope and spirit of the invention as set forth in the following claims.

What is claimed is:

1. An apparatus for controlling a high-power drive device external to a package of a motor drive circuit, the apparatus comprising:
   the motor drive circuit comprising:
      a driver configured to control the high-power drive device at least partially based on a first reference voltage, a second reference voltage, and a control signal based on a received control signal received by the motor drive circuit;
      a fault circuit configured to generate a failure indicator based on a voltage across terminals of the high-power drive device, a fault condition being at least partially based on the failure indicator;
      a first terminal coupled to the driver and configured to charge a node of the high-power drive device over a first length of time in response to an absence of the fault condition and a first level of the control signal; and a second terminal coupled to the driver and configured to discharge the node of the high-power drive device over a second length of time, the second length of time being different from the first length of time, wherein the second terminal discharges the node of the high-power drive device over the second length of time in response to the absence of the fault condition and a second level of the control signal, and wherein at least one of the first terminal and the second terminal is configured to discharge the node of the high-power drive device over a third length of time in response to a presence of the fault condition, the third length of time being independent of the second length of time.

2. The apparatus, as recited in claim 1, wherein the first terminal is configured to discharge the node of the high-power drive device over the third length of time in response to the presence of the fault condition.

3. The apparatus, as recited in claim 1, wherein the third length of time is independent of the first length of time.

4. The apparatus, as recited in claim 1, wherein the driver is sufficient to control the high-power drive device.

5. The apparatus, as recited in claim 1, further comprising:
a third terminal of the motor drive circuit to receive the first reference voltage, a local supply voltage based on the first reference voltage;
a fourth terminal of the motor drive circuit to receive the second reference voltage; and
a fifth terminal of the motor drive circuit to receive a third reference voltage, the third reference voltage having a level between a level of the first reference voltage and a level of the second reference voltage.

6. The apparatus, as recited in claim 1, wherein the motor drive circuit further comprises:
a third terminal configured to be coupled to a first terminal of the high-power drive device;
a fourth terminal configured to be coupled to a control terminal of the high-power drive device; and
a clamp circuit configured to short circuit a path between the third terminal of the motor drive circuit and the fourth terminal of the motor drive circuit based on a voltage across the third terminal and the fourth terminal.

7. The apparatus, as recited in claim 1, wherein the driver comprises:
a first device of a first type coupled to the first terminal and configured as a pull-up device; and
a second device of a second type coupled to the second terminal and configured as a pull-down device.

8. The apparatus, as recited in claim 7, wherein the driver further comprises:
an additional device of the second type coupled to the first terminal, the additional device being smaller than the second device.

9. The apparatus, as recited in claim 7,
wherein the driver further comprises an additional device of the second type coupled to the first terminal and configured as a pull-down device.

10. The apparatus, as recited in claim 1, wherein the motor drive circuit further comprises:
an isolation channel coupled between a primary portion of the motor drive circuit and a secondary portion of the motor drive circuit,
wherein the control signal received by the motor drive circuit is received by the primary portion and the driver is included in the secondary portion.

11. The apparatus, as recited in claim 1, wherein the high-power drive device is an insulated-gate bipolar transistor (IGBT) responsive to a voltage level of hundreds of volts on a collector terminal of the IGBT, the first reference voltage has a level in a range of tens of volts, the received control signal has a level less than ten volts, and the driver is coupled to a gate of the IGBT device.

12. The apparatus, as recited in claim 1, further comprising:
a first passive device coupled between the first terminal of the motor drive circuit and the high-power drive device; and
a second passive device coupled between the second terminal of the motor drive circuit and the high-power drive device.

13. The apparatus, as recited in claim 12, wherein the motor drive circuit further comprises:
a third passive device coupled between the first terminal of the motor drive circuit and the high-power drive device.

14. The apparatus, as recited in claim 1, further comprising:
a voltage converter circuit configured to generate a second control signal to drive a primary side of a transformer external to the package of the motor drive circuit to achieve a target voltage on a secondary side of the transformer, the second control signal being generated based on a feedback signal indicative of a voltage on a first terminal of the secondary side of the transformer.

15. The apparatus, as recited in claim 14, wherein the first reference voltage is based on the voltage on the first terminal of the secondary side of the transformer, the second reference voltage is received from a second terminal of the secondary side of the transformer, and a third terminal of the secondary side of the transformer is coupled to a third reference voltage.

16. The apparatus, as recited in claim 1, further comprising:
a motor coupled to the high-power drive device.

17. A method for controlling a high-power drive device external to a package of a motor drive circuit, the method comprising:
sensing a voltage across terminals of the high-power drive device; and
determining a fault condition at least partially based on the sensed voltage;
charging a node of the high-power drive device over a first length of time, using a first terminal, in response to an absence of the fault condition and a first level of a control signal based on a received control signal received by the motor drive circuit; and
discharging the node of the high-power drive device over a second length of time, using a second terminal, the second length of time being different from the first length of time,
wherein the node of the high-power drive device is discharged over the second length of time in response to the absence of the fault condition and a second level of the control signal, the method further comprising:
discharging the node of the high-power drive device over a third length of time using at least one of the first terminal and the second terminal, the discharging being in response to detection of the fault condition, the third length of time being independent of the second length of time.

18. The method, as recited in claim 17, wherein the first terminal discharges the node of the high-power drive device over the third length of time in response to a presence of the fault condition, the third length of time being independent of the first and second lengths of time.

19. The method, as recited in claim 17, wherein the node of the high-power drive device is discharged over the second length of time in response to an absence of the fault condition and a second level of the control signal, the method further comprising:
  selecting the first length of time using a first passive element coupled to the first terminal of the motor drive circuit;
  selecting the second length of time using a second passive element coupled to the second terminal of the motor drive circuit; and
  selecting the third length of time using at least a third passive element coupled to at least one of the first terminal and the second terminal of the motor drive circuit.

20. The method, as recited in claim 17, further comprising:
  short-circuiting a path of the motor drive circuit between a third terminal of the motor control circuit and a fourth terminal of the motor control circuit and coupled between a control terminal of the high-power drive device and another terminal of the high-power drive device, the short-circuiting being in response to a voltage level on the control terminal of the high-power drive device.

21. The method, as recited in claim 17, further comprising:
  generating a second control signal to drive a primary side of a transformer external to the package of the motor drive circuit to achieve a target voltage on a secondary side of the transformer, the second control signal being generated based on a feedback signal indicative of a voltage on a first terminal of the secondary side of the transformer.

22. The method, as recited in claim 17, further comprising:
  isolating a primary portion of the motor drive circuit and a secondary portion of the motor drive circuit; and
  receiving the control signal by the primary portion, wherein the controlling is performed by the secondary portion.

23. The method, as recited in claim 17, wherein the high-power drive device is an insulated-gate bipolar transistor (IGBT) responsive to a voltage level of hundreds of volts on a collector terminal of the IGBT, the charging and discharging having a range of tens of volts, and the received control signal having a level less than ten volts.

24. An apparatus for controlling a high-power drive device external to a package of a motor drive circuit, the apparatus comprising:
  means for generating a failure indicator based on a voltage across terminals of the high-power drive device, a fault condition being at least partially based on the failure indicator;
  means for charging a node of the high-power drive device over a first length of time, using a first terminal, in response to an absence of the fault condition and a first level of a signal based on a control signal received by the motor drive circuit; and
  means for discharging the node of the high-power drive device over a second length of time, using a second terminal, the second length of time being different from the first length of time,
  wherein at least one of the means for charging the node and the means for discharging the node includes means for soft-discharging the node of the high-power drive device over a third length of time using at least one of the first terminal and the second terminal, in response to detection of the fault condition, the third length of time being independent of the first and second lengths of time.

* * * * *